March 31, 1953  J. F. HALSTEAD  2,633,134
CIGARILLO MACHINE

Original Filed July 23, 1942  4 Sheets-Sheet 3

INVENTOR
JOHN F. HALSTEAD
BY George Hastings
ATTORNEY

March 31, 1953  J. F. HALSTEAD  2,633,134
CIGARILLO MACHINE

Original Filed July 23, 1942  4 Sheets-Sheet 4

INVENTOR
JOHN F. HALSTEAD
BY George S. Hastings
ATTORNEY

Patented Mar. 31, 1953

2,633,134

UNITED STATES PATENT OFFICE 2,633,134

CIGARILLO MACHINE

John F. Halstead, Brooklyn, N. Y., assignor to International Cigar Machinery Company, a corporation of New Jersey Original application July 23, 1942, Serial No. 452,001. Divided and this application January 9, 1947, Serial No. 720,960

9 Claims. (Cl. 131—79)

This invention relates to cigar making machines, more particularly to machines for making short filler cigars, wherein the cigar bunches are molded to the required shape before the outer wrapper is applied thereto. Heretofore in short filler machines of the type shown in the patent to H. H. Wheeler, No. 2,157,537, issued May 9, 1939, there was provided a turret having shaping pockets wherein the cigar bunches were inserted and shaped by pressing mold covers upon the inserted bunches. The mold turret of the prior machines referred to was provided with an electric heating unit which heated the pockets to a temperature at which the inserted bunches were sufficiently dried out to retain their molded shape. To obtain the proper temperature of the pockets it was necessary to turn on the heating unit nearly an hour before molding the cigar bunches, and the attendants often began operating the mold turret before the pockets had attained the proper temperature. One of the objects of the present invention is to provide a mold turret construction which will not require pre-heating, and to this end there is provided a plurality of heated shapers which engage the bunches in the pockets and shape and dry the same sufficiently so that they will retain their molded shape.

Moreover in prior short filler cigar machines all or most of the mold pockets of the mold turret were covered by the mold covers during the molding of the cigar bunches. Therefore the moisture in the cigar bunches being molded could not evaporate sufficiently to permit the cigar bunches to be dried out properly. A further object of the invention, therefore is to permit the evaporation of the moisture from the cigar bunches in the mold pockets after they have been shaped therein. To this end the cigar bunches after being engaged and shaped in one of the mold pockets by a heated shaper or cover at a predetermined station, or a pair of adjoining stations of the mold turret, are left uncovered as they are moved to the bunch-ejecting station of the mold turret. Thus the moisture may evaporate from the shaped cigar bunch to permit it to be dried out properly. If desired, the cigar bunches may be engaged and shaped again by a shaper at another station, or a pair of adjoining stations, intermediate the first shaping station and the bunch-ejecting station of the mold turret.

With these and other objects not specifically mentioned in view, the invention consists in certain constructions and combinations hereinafter fully described and set forth in the appended claims.

In the accompanying drawings which form a part of this specification and in which like characters of reference indicate the same or like parts:

Figure 1:
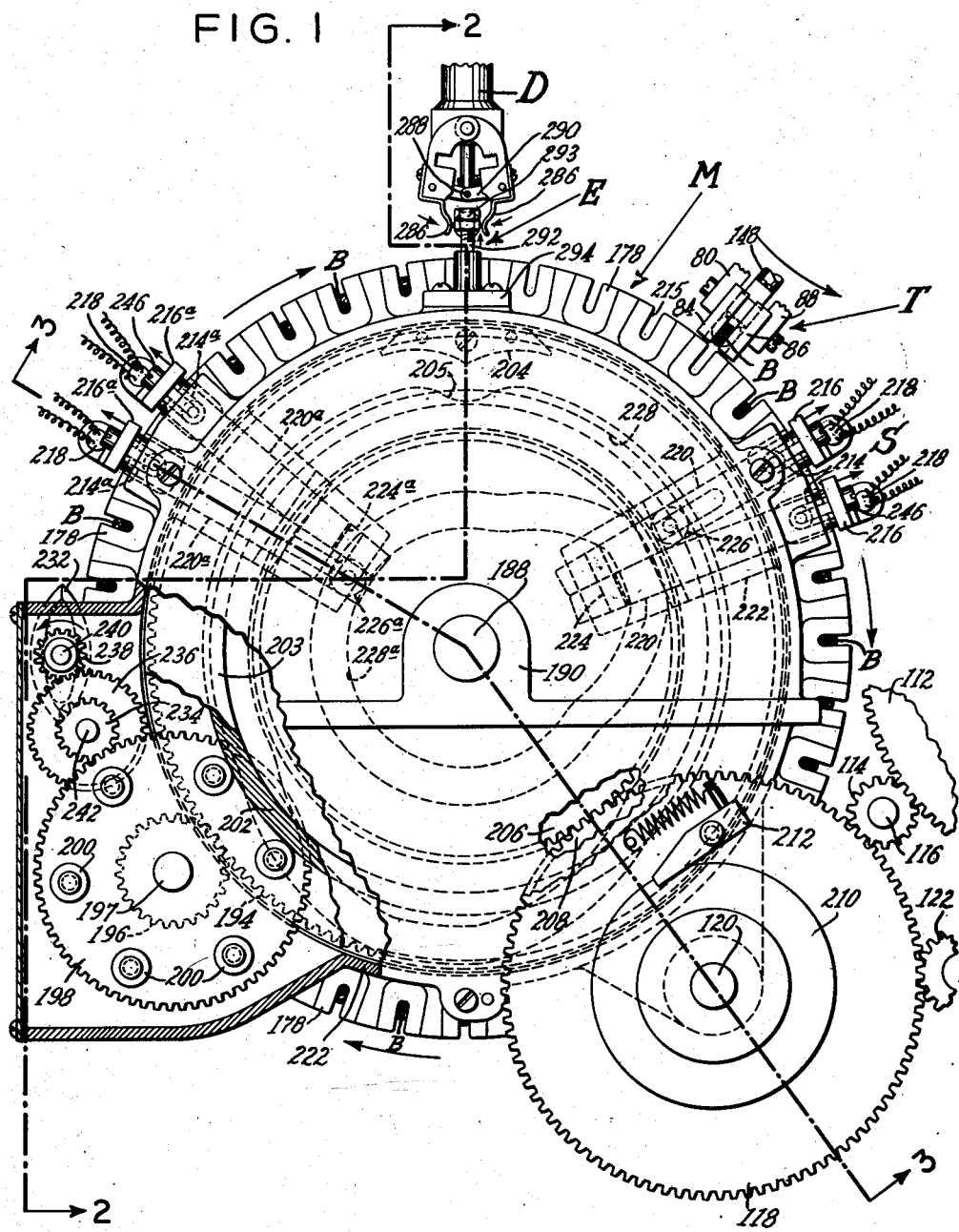
Fig. 1 is an end elevation of the cigar bunch molding turret a portion of its housing and the indexing disk being broken away to expose the remainder of the indexing mechanism.

A cigar bunch B is transferred by a transfer T into position to be delivered to one of the mold pockets of the mold turret M when transfer T swings to the position shown in Fig. 1. The transfer T is provided with an oscillating member 80 on which are supported the jaws 84 and 86 which grip the cigar bunch being transferred. The motion of member 80 is controlled by mechanism driven through gears 112 and 114 (Fig. 1), gear 114 being driven from gear 208 hereinafter described and mounted on shaft 116. The cigar bunch B is ejected from jaws 84 and 86 into the mold pocket at the bunch-receiving station of mold turret M by a plunger having a shank 148 slidably mounted on member 80. The cigar bunch B is transferred from a bunch rolling apron to the transfer T by transfer mechanism (not shown). The transfer T and said transfer mechanism are the subject matter of my co-pending application now Patent No. 2,443,453 issued June 15, 1949 of which this application is a division. Accordingly reference may be had to said patent No. 2,443,453 for further details of the construction of the transfer T and said transfer mechanism.

Figure 2:
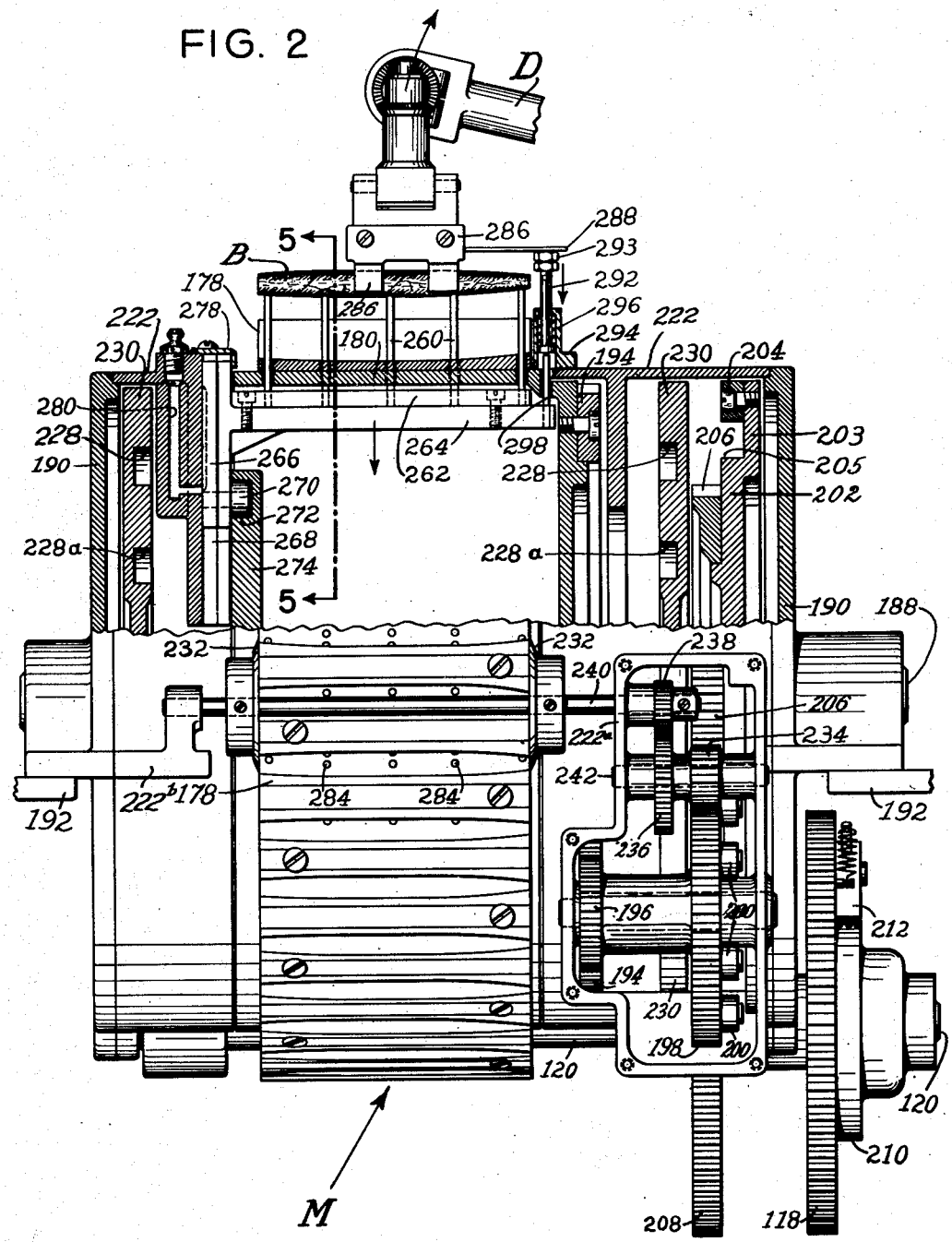
Fig. 2 is a side elevation, partly in section, of the mold turret taken on line 2—2 of Fig. 1.
Figure 3:
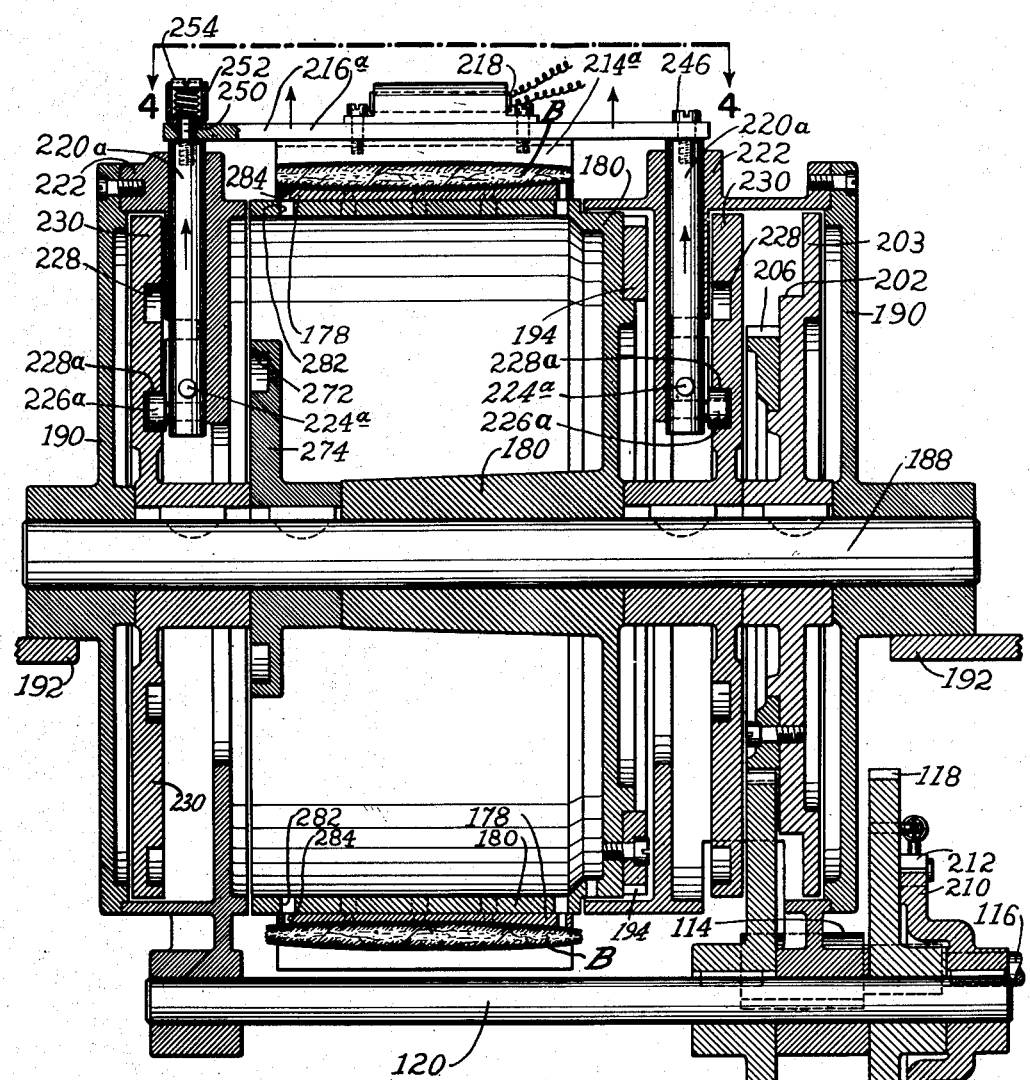
Fig. 3 is also a sectional side elevation of the mold turret taken on line 3—3 of Fig. 1.

The mold turret M has a rotatable drum 180 which carries the mold pockets 178 upon its periphery and is loosely mounted on a horizontal shaft 188 supported by suitable bearings of a stationary housing 190 (Figs. 1–3) attached to the main frame 192 of the cigar machine (not shown). To turret drum 180 is secured a ring gear 194 which is intermittently driven by a gear 196 mounted on a spindle 197 supported by a housing 222a formed on bracket 222 (Figs. 1 and 2). The hub of gear 196 is formed integrally (as shown in Fig. 2) with the hub of an indexing gear 198 which is also mounted on spindle 197. Gear 198 carries a number of rollers 200 which successively engage with an index cam disk 202 having a circumferential flange 203 to which is fastened an index cam lug 204 whose inner edge is shaped (as shown in Fig. 1) and disposed opposite an indentation 205 (Fig. 1) in the periphery of disk 202 to provide a track in which each roller 200 enters successively. The shape of this track is such that it will displace the roller entering it to turn the gear 198 sufficiently to rotate the turret drum 180 the distance between centers of adjacent mold pockets. This indexing mechanism is similar to that shown in the Wheeler Patent No. 2,157,537, except it is mounted on the turret.

Index disk 202 is mounted on shaft 188 and carries a gear 206 which is continuously driven by the gear 208 (Figs. 1, 2 and 3) mounted on shaft 120. On shaft 120 is keyed a one-tooth ratchet 210 which is driven by a spring pawl 212 pivoted to a continuously driven gear 118 which is driven by gear 122 mounted on shaft 124. This construction enables the operator to turn the mold turret for cleaning the mold pockets without turning the entire machine, upon disengaging the pawl 212 from ratchet 210, and upon reengagement of the pawl with the ratchet, proper indexing and timing are assured. In operation the indexing of the turret is such that each mold pocket stops in alignment with the respective mechanisms at the bunch loading and ejecting stations.

After the cigar bunches B are inserted into the mold pockets by the ejecting plunger of the transfer T, they are advanced to a shaping station S (Fig. 1) where the bunches are successively pressed into the mold pockets by a pair of shapers 214 which simultaneously enter adjoining mold pockets 178. The cavity in the mold pockets, in the particular embodiment of the invention shown, conforms to the desired shape of a cheroot, which is also called a cigarillo, and slots 215 are formed in the ends of the pockets through which the ends of the inserted bunches project. The operating faces of the shapers 214 conform to the desired shape of cheroot or cigarillo. Each shaper 214 is mounted on a cover plate 216 which carries a suitable heating element, such as an electric cartridge 218, which imparts heat to its respective shaper 214 to dry out the bunch while shaping it. The covers 216 are detachably mounted on pairs of operating rods 220 which are slidably supported by a pair of annular brackets 222 (Figs. 1 and 2) fastened to housing 190. In order to simplify construction and still assure a simultaneous operation of the two shapers 214, the operating rods 220 at each end of the two ends of cover plates 216 are connected at their lower ends by a pin 224 rigid with one rod and loosely fitting a transverse hole in the other rod, so that it is necessary to provide an operating or cam roller 226 on only one rod at each end of one of said cover plates to assure proper operation of both shapers. Each cam roller 226 is pivoted to its respective rod and engages with a cam track 228 of its respective cam 230, both cams 230 being keyed to the continuously rotating shaft 188.

After the bunch B has successively passed the two shapers at the shaping station S, the protruding ends of the bunches are cut off while passing a pair of rotary trimming knives 232 (Figs. 1 and 2). Said knives are of a somewhat oval shape and are provided with cutting edges at both ends and rotate in the direction of the arrow (indicated in Fig. 1) and only while a mold pocket passes the trimming station. The intermittent motion of the knives is controlled by index gear 198 which meshes with a gear 234 which is mounted on a spindle 242 carried by the housing 222a formed on one of the brackets 222 and connected with a gear 236 also mounted on spindle 242, as shown in Fig. 2. Gear 236 drives a gear 238 secured to knife 240 carrying the two trimming knives 232, the shaft 240 being supported by suitable bearings provided in the brackets 222, one of the shaft bearings being provided on the interior of the housing portion 222a on the right hand bracket 222 (Fig. 2) and the other bearing being provided in a lug 222b formed on the other bracket 222. The knives rotate 2½ revolutions during passage of the bunch ends across their range of action, so that the latter are engaged five times by the cutting edges of the knives. The knives are rotating as the bunch ends approach, so that the tip of the first blade knicks the bunch end with the subsequent cutting edges progressively cutting deeper as the turret advances. Thus the cut made by each cutting edge may be only $\frac{1}{32}$ inch at a time instead of trimming with one cut as heretofore. After passing the trimming station, the bunches in molds 178 are engaged by a pair of shapers 214a which are of the same shape and construction as shapers 214 at the first shaping station S. Each shaper 214a is attached to a cover plate 216a, each of which is detachably mounted on a pair of operating rods 220a, slidably supported by the brackets 222. Each pair of rods 220a are connected by a pin 224a loosely fitting transverse holes therein, in a manner similar to the connection of rods 220 by pin 224 described above. Each pair of rods is provided with a cam roller 226a engaging with cam tracks 228a formed in a pair of cams 230 in the portions thereof within cam tracks 228.

Figure 4:
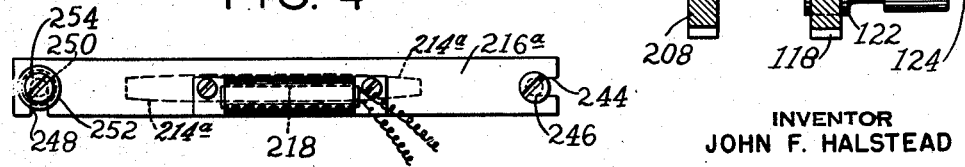
Fig. 4 is a plan view on line 4—4 of Fig. 3 showing one shaper in detail.

For easy detachment or exchange of the shapers, the cover plates 216 and 216a are each provided with a slot 244 (Fig. 4) engaging with a stud 246 held by the corresponding rod 220 and 220a, respectively. The opposite end of each cover plate has also a slot 248 and a circular conical indentation 250 engaging with the lower conical portion of a spring-pressed locking member 252 supported and guided by a suitable stud 254 held by the corresponding operating rod 220 and 220a, respectively. It might also be pointed out that the heating elements 218 can be removed from their housing on covers 216 and 216a so that the cigar bunches can be shaped with or without the aid of heat, as desired.

Figure 5:
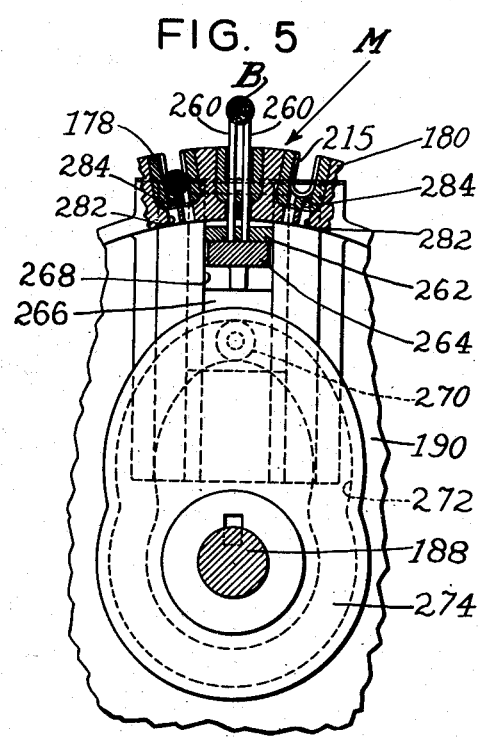
Fig. 5 is a partial sectional end elevation of the mold turret illustrating the bunch ejector mechanism, taken on line 5—5 of Fig. 2.

The cigar bunches leaving the second shaping station have been properly formed, trimmed and shaped, and are then removed from their respective molds at the ejecting station E where a set of suitable ejector rods 260 lift the finished bunch out of the mold and deliver the same to a bunch transfer D such as illustrated in Clausen Patent No. 2,334,174, issued November 16, 1943. The ejector rods 260 are (Figs. 2 and 5) mounted on a guide bar 262 secured to a suitable bracket 264 provided with a guide flange 266 engaging with a suitable vertical guide track 268 provided in bracket 222 (Fig. 2). To flange 266 is pivoted a cam roller 270 engaging with a cam track 272 of a cam 274 mounted on shaft 188. To prevent any dust from entering into track 272, a cover plate 278 is provided on bracket 222, and by means of a conveniently located oil hole 280 lubrication can be effected without the danger of dust or tobacco particles reaching the slide surfaces of the track 268 (Fig. 6). The turret drum 180 as well as the bottom portion of the molds 178 are provided with suitable holes 282 and 284 respectively, through which ejector rods 260 protrude and lift the finished cigar bunch out of the mold (Figs. 2 and 5).

The finished cigar bunch B is taken off the ejector rods by the heretofore mentioned bunch transfer D which waits with its open jaws 286 at the ejecting station E. The finished bunch B of course is pushed upward in between said open jaws of the transfer D. When the cigar bunch reaches its highest position a rod 288 protruding from the toggle joint of the toggle 290 (Fig. 1) is tripped by a spring-pressed plunger 292 which carries a nut 293 which engages rod 288 and thereby effects the closing of jaws 286. Plunger 292 is supported and guided by a suitable bracket 294 secured to bracket 222. Said plunger is normally held down by a spring 296 but is moved upward when a pin 298 held by bracket 264 contacts the bottom of said plunger during the upward movement of bracket 264 during the bunch ejecting operation. The bunch so gripped in the transfer is transported therein to wrapper-applying position (not shown). Since the details of the construction of the transfer form no part of the invention, further description thereof is deemed unnecessary since they are shown in the above mentioned Patent No. 2,334,174.

What is claimed is:

1. In a cigar machine, the combination with a moving member having a series of pockets which are each adapted to receive a cigar bunch, of a plurality of movable shapers positioned at predetermined stations adapted to successively enter pockets in said member and coact therewith to shape cigar bunches inserted in the pockets and a heating element mounted on said shaper and adapted to heat the same so that the bunches will be dried out while engaged by the shaper at the station.

2. The combination with a rotary mold turret having a series of molds provided with pockets which are each adapted to receive a cigar bunch, of a pair of shapers connected to each other and adapted to enter a pair of adjoining pockets and shape cigar bunches inserted therein, a pair of slides to which said shapers are secured, a member rigid with one of said slides and loosely engaging the other of said slides and linking said pair of slides one to the other, a pair of slideways extending radially of said turret and wherein said slides are mounted for movement to guide said shapers in and out of said pockets, a single cam follower connected to one of said slides, a cam concentrically mounted relative to said turret and having a cam track to engage said cam follower to simultaneously move said shapers in and out of said pockets, and means for rotating said cam to move said shapers into and out of said pockets.

3. In a cigar machine, the combination with a member having a series of pockets which are each adapted to receive a cigar bunch, of a movable shaper adapted to enter each pocket successively in said member and coact therewith to shape cigar bunches inserted therein, and an electrical heating element mounted on said shaper and adapted for heating the same so that the bunches will be dried out while engaged by the shaper.

4. In a cigar machine having a rotary turret provided with a series of mold pockets which are each adapted to receive a cigar bunch, and means for intermittently rotating said turret to advance each pocket successively from a bunch receiving station to a bunch ejecting station, the combination with a plurality of movable shapers adapted to enter said pockets during the intermittency of their movement from the bunch receiving station to the bunch ejecting station and coact therewith to shape cigar bunches inserted in the pockets at the bunch receiving station, at least one of said shapers being heated to dry out the bunches engaged by the heated shaper.

5. The combination with a rotary mold turret having a series of molds provided with radially extending pockets which are each adapted to receive a cigar bunch, of a pair of shapers adapted simultaneously to enter a plurality of said pockets and shape cigar bunches inserted therein, said shapers being mounted for movement along different radii of said turret corresponding to the respective pockets entered, means in contact with said shapers and securing them together for simultaneous movement, a single cam follower only mounted on one of said shapers, and a cam engaging said follower and operating to displace said shapers simultaneously into and out of a plurality of mold pockets to shape bunches therein.

6. In a cigar machine, the combination with a turret having a series of open mold pockets on its periphery each adapted to receive a cigar bunch, means for intermittently advancing each of said mold pockets successively to a bunch-shaping station from a station at which a cigar bunch is inserted therein, a movable shaper adapted to enter each pocket successively at the bunch-shaping station and coact therewith to shape a cigar bunch therein, means for heating the shaper only, and mechanism for inserting said shaper into the pocket at the bunch-shaping station to shape the cigar bunch therein and then withdrawing said shaper before the next pocket is moved to the bunch-shaping station whereby the moisture in the shaped cigar bunches may readily evaporate from the open pockets to permit them to be properly dried out.

7. In a cigar machine, the combination with a turret having a series of open mold pockets on its periphery each adapted to receive a cigar bunch, means for intermittently advancing each of said mold pockets successively to a bunch-shaping station from a station at which a cigar bunch is inserted therein, a heated movable shaper adapted to enter each pocket successively at the bunch-shaping station and coact therewith to shape a cigar bunch therein, and mechanism for inserting the said shaper into the pocket at the bunch-shaping station to shape the cigar bunch therein and then withdrawing said shaper before the next pocket is moved to the bunch-shaping station whereby the moisture in the heated and shaped cigar bunches may readily evaporate from the open pockets to permit them to be properly dried out.

8. The combination with a rotary mold turret having a series of molds provided with pockets which are each adapted to receive a cigar bunch, of a pair of shapers connected to each other and adapted to enter a pair of adjoining pockets and shape cigar bunches inserted therein, a pair of slides to which said shapers are secured, a member linking said pair of slides one to the other, a pair of slideways extending radially of said turret and wherein said slides are mounted for movement to guide said shapers in and out of said pockets, a single cam follower mounted on one of said slides only, a cam concentrically mounted relative to said turret and having a cam track to engage said cam follower to simultaneously move said shapers in and out of said pockets, and means for rotating said cam to move said shapers into and out of said pockets.

9. The method of making a cigar bunch comprising feeding a quantity of tobacco to a receiving station, rotating said station to a heating zone, maintaining said station stationary while simultaneously shaping the tobacco and applying heat directly thereto on only a portion of its surface, discontinuing the application of heat, rotating said station from said zone, supporting said formed quantity of tobacco while it dries and cools, and maintaining said station stationary while removing said tobacco.

JOHN F. HALSTEAD.

REFERENCES CITED

The following references are of record in the file of this patent:

UNITED STATES PATENTS

| Number | Name | Date |
|---|---|---|
| 146,126 | Dombrowsky | Jan. 6, 1874 |
| 260,638 | Bach | July 4, 1882 |
| 809,410 | Van Gulpen | Jan. 9, 1906 |
| 1,982,292 | Granstedt | Nov. 27, 1934 |
| 2,102,298 | Wheeler | Dec. 14, 1937 |
| 2,140,093 | Stelzer | Dec. 13, 1938 |
| 2,157,537 | Wheeler | May 9, 1939 |
| 2,314,734 | Ptasnik | Mar. 23, 1943 |
| 2,356,636 | Wheeler | Aug. 22, 1944 |

FOREIGN PATENTS

| Number | Country | Date |
|---|---|---|
| 11,322 | Great Britain | of 1895 |